(12) United States Patent
Chintalapudi et al.

(10) Patent No.: US 8,798,089 B2
(45) Date of Patent: Aug. 5, 2014

(54) WIRELESS COMMUNICATIONS

(75) Inventors: Krishna Kant Chintalapudi, Malleswaram (IN); Božidar Radunović, Cambridge (GB); Ramachandran Ramjee, Malleswaram (IN); Eugenio Magistretti, Houston, TX (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 13/162,963

(22) Filed: Jun. 17, 2011

(65) Prior Publication Data

US 2012/0320887 A1    Dec. 20, 2012

(51) Int. Cl.
*H04W 4/00* (2009.01)
*H04W 74/08* (2009.01)
*H04L 12/413* (2006.01)
*H04L 1/18* (2006.01)
*H04L 12/56* (2006.01)
*H04L 1/00* (2006.01)
*H04L 12/64* (2006.01)
*H04W 84/12* (2009.01)

(52) U.S. Cl.
CPC ...... *H04W 74/0841* (2013.01); *H04W 74/0808* (2013.01); *H04L 12/413* (2013.01); *H04L 1/1854* (2013.01); *H04L 47/00* (2013.01); *H04L 1/00* (2013.01); *H04L 12/6418* (2013.01); *H04W 84/12* (2013.01); *H04L 2001/0093* (2013.01); *H04L 2001/0097* (2013.01)
USPC ......................................................... 370/445

(58) Field of Classification Search
USPC ........................................ 370/338, 445–448
See application file for complete search history.

(56) References Cited

U.S. PATENT DOCUMENTS

| | | | | | |
|---|---|---|---|---|---|
| 4,063,220 | A | * | 12/1977 | Metcalfe et al. | 370/462 |
| 4,099,024 | A | * | 7/1978 | Boggs et al. | 370/293 |
| 4,380,761 | A | * | 4/1983 | Boggs | 370/229 |
| 4,481,626 | A | * | 11/1984 | Boggs et al. | 370/445 |
| 4,593,282 | A | * | 6/1986 | Acampora et al. | 370/447 |
| 5,335,226 | A | * | 8/1994 | Williams | 370/445 |
| 5,657,326 | A | * | 8/1997 | Burns et al. | 370/349 |
| 5,940,399 | A | * | 8/1999 | Weizman | 370/445 |

(Continued)

OTHER PUBLICATIONS

Sen, et al., "CSMA/CN: Carrier Sense Multiple Access with Collision Notification", Retrieved at <<http://synrg.ee.duke.edu/papers/cn-mobicom.pdf>>, Proceedings of the sixteenth annual international conference on Mobile computing and networking, Sep. 20-24, 2010, pp. 12.

(Continued)

*Primary Examiner* — Mark Rinehart
*Assistant Examiner* — Kenneth P Hunt
(74) *Attorney, Agent, or Firm* — Stephen Wight; Alin Corie; Micky Minhas

(57) ABSTRACT

The claimed subject matter provides a method for wireless communications. The method includes transmitting, by a first node in a wireless network, a first preamble. The method also includes detecting, in parallel with transmitting the first preamble, a transmission of a second preamble. A second node in the wireless network transmits the second preamble. Additionally, the method includes determining a later start between the transmission of the first preamble and the transmission of the second preamble. The method further includes terminating transmission of the first preamble the determining indicates that the transmission of the first preamble started after the transmission of the second preamble.

20 Claims, 13 Drawing Sheets

(56) References Cited

U.S. PATENT DOCUMENTS

| | | | | |
|---|---|---|---|---|
| 6,078,607 | A | * | 6/2000 | Monroe et al. ............... 375/145 |
| 7,266,085 | B2 | * | 9/2007 | Stine ........................... 370/252 |
| 7,773,961 | B2 | | 8/2010 | Ding et al. |
| 7,826,474 | B2 | | 11/2010 | Koski et al. |
| 8,331,969 | B2 | * | 12/2012 | Gholmieh et al. ............ 455/515 |
| 2007/0079208 | A1 | * | 4/2007 | Shvodian ..................... 714/749 |
| 2007/0195798 | A1 | | 8/2007 | Peng et al. |

OTHER PUBLICATIONS

Sen, et al., "Moving Away from Collision Avoidance: Towards Collision Detection in Wireless Networks", Retrieved at <<http://synrg.ee.duke.edu/papers/csma-cn.pdf>>, Oct. 2009, pp. 1-6.

"10Base-T Interface", Retrieved at <<http://www.systemyde.com/pdf/ethr_top.pdf>>, May 2009, pp. 3.

Yang, et al., "Split-channel Pipelined Packet Scheduling for Wireless Networks", Retrieved at <<http://www.google.com/url?sa=t&source=web&cd=3&ved=0CCAQFjAC&url=http%3A%2F%2Fciteseerx.ist.psu.edu%2Fviewdoc%2Fdownload%3Fdoi%3D10.1.1.103.4170%26rep%3Drep1%26type%3Dpdf&rct=j&q=wifi%20and%20preamble%20and%20reduce%20ack%20or%20%22channel%20access%22%20overhead&ei=7nqmTZ-MF8y1hAeFgoHZCQ&usg=AFQjCNEyBCKOJbed5LWdOF5byyVAiAYKLQ&cad=rja>>, IEEE Transactions on Mobile Computing, Mar. 2006.

"GainSpan 802.11b Wi-Fi Modules Extend Range and Battery Life", Retrieved at <<http://www.gainspan.com/technology/B_is_better.php>>, Retrieved Date: Apr. 14, 2010, pp. 2.

Choi, et al., "Achieving Single Channel, Full Duplex Wireless Communication", Retrieved at <<http://sing.stanford.edu/pubs/sing-10-00.pdf>>, Proceedings of the sixteenth annual international conference on Mobile computing and networking, 2010, pp. 12.

Gollakota, et al., "Zigzag Decoding: Combating Hidden Terminals in Wireless Networks", Retrieved at <<http://nms.csail.mit.edu/~dina/pub/ZigZag.pdf>>, Proceedings of the ACM SIGCOMM conference on Data communication, vol. 38 No. 4, Aug. 17-22, 2008, pp. 159-170.

Heusse, et al., "Idle Sense: An Optimal Access Method for High Throughput and Fairness in Rate Diverse Wireless LANs", Retrieved at <<http://conferences.sigcomm.org/sigcomm/2005/paper-HeuRou.pdf>>, conference on Applications, technologies, architectures, and protocols for computer communications, vol. 35 No. 4, Aug. 21-26, 2005, pp. 12.

Jamieson, et al., "PPR: Partial Packet Recovery for Wireless Networks", Retrieved at <<http://citeseer.ist.psu.edu/viewdoc/download;jsessionid=25ACFA06671DA1E40DDD83738A72C4BF?doi=10.1.1.117.7455&rep=rep1&type=pdf>>, conference on Applications, technologies, architectures, and protocols for computer communications, vol. 37 No. 4, Aug. 27-31, 2007, pp. 12.

Jamieson, et al., "Understanding the Real-world Performance of Carrier Sense", Retrieved at <<http://conferences.sigcomm.org/sigcomm/2005/paper-JamHul.pdf>>, Proceedings of the ACM SIGCOMM workshop on Experimental approaches to wireless network design and analysis, Aug. 22-26, 2005, pp. 6.

Judd, et al., "Characterizing 802.11 Wireless Link Behavior", Retrieved at <<http://www.springerlink.com/content/t131747818643qk2/fulltext.pdf>>, vol. 16 No. 1, Jun. 19, 2008, pp. 167-182.

Kochut, et al., "Sniffing out the Correct Physical Layer Capture Model in 802.11b", Retrieved at <<http://www.ieee-icnp.org/2004/papers/7-1.pdf>>, Proceedings of the 12th IEEE International Conference on Network Protocols, 2004, pp. 10.

Lakshmanan, et al., "The Myth of Spatial Reuse with Directional Antennas in Indoor Wireless Networks", Retrieved at <<http://www.pam2010.ethz.ch/papers/full-length/6.pdf>>, Proceedings of the 11th international conference on Passive and active measurement, 2010, pp. 10.

Lee, et al., "Improved Modeling of IEEE 802.11a PHY through Fine-Grained Measurements", Retrieved at <<http://www.hpl.hp.com/personal/Sung-Ju_Lee/abstracts/papers/comnet2009.pdf>>, The International Journal of Computer and Telecommunications Networking, vol. 54 No. 4, Mar. 10, 2010, pp. 17.

Li, et al., "Remap Decoding: Simple Retransmission Permutation can Resolve Overlapping Channel Collisions", Retrieved at <<http://www.bell-labs.com/user/erranlli/publications/MOBICOM10.pdf>>, Sep. 20-24, 2010, pp. 11.

Lin, et al., "ZipTx: Harnessing Partial Packets in 802.11 Networks", Retrieved at <<http://nms.csail.mit.edu/~dina/pub/ziptx.pdf>>, Proceedings of the 14th ACM international conference on Mobile computing and networking, Sep. 14-19, 2008, pp. 12.

Liu, et al., "Pushing the Envelope of Indoor Wireless Spatial Reuse using Directional Access Points and Clients", Retrieved at <<http://www.cs.cmu.edu/~xil/speed.pdf>>, Proceedings of the sixteenth annual international conference on Mobile computing and networking, Sep. 20-24, 2010, pp. 12.

Radunovic, et al., "Rethinking Indoor Wireless Mesh Design: Low Power, Low Frequency, Full-duplex", Retrieved at <<http://www-scf.usc.edu/~hbalan/wimesh.pdf>>, Proceedings of Fifth IEEE Workshop on Wireless Mesh Networks, Jun. 21, 2010, pp. 6.

Rozner, et al., "ER: Efficient Retransmission Scheme for Wireless LANs", Retrieved at <<http://www.cs.utexas.edu/~lili/papers/pub/CoNext07.pdf>>, ACM CoNEXT conference, Dec. 10-13, 2007, pp. 12.

Tan, et al., "Fine Grained Channel Access in Wireless LAN", Retrieved at <<http://conferences.sigcomm.org/sigcomm/2010/papers/sigcomm/p147.pdf>>, Proceedings of the ACM SIGCOMM 2010 conference on SIGCOMM, Aug. 30-Sep. 3, vol. 40 No. 4, 2010, pp. 147-158.

Verkaik, et al., "Softspeak: Making VoIP Play Fair in Existing 802.11 Deployments", Retrieved at <<http://www.cs.nyu.edu/srg/docs/NSDI09-Yuvraj_Agarwal-PREPRINT.pdf>>, USENIX Symposium on Networked Systems Design and Implementation, Apr. 2009, pp. 1-14.

* cited by examiner

100

200

700

1200

US 8,798,089 B2

WIRELESS COMMUNICATIONS

BACKGROUND

Wireless communications, including Wi-Fi networks, employ a range of connectivity technologies. Examples of these technologies include wireless local area networks based on the IEEE 802.11 standards. Wi-Fi enabled devices (nodes) may connect to the Internet when within range of a connected wireless network. In recent years, Wi-Fi physical layer data rates have increased from 1 megabits per second (Mbps) in the original 802.11 standard to 1 gigabits per second (Gbps) in the 802.11 ac standard. However, while physical layer data rates have increased, user level throughputs have not achieved a commensurate increase. One reason that throughputs have not similarly increased is due to channel access overhead. For example, while the transmission time for a 1,500 byte payload is only 20 microseconds ($\mu s$) at 600 Mbps, the average channel access overhead may exceed 100 $\mu s$, which is over 500% of the packet transmission time.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for wireless communications. The method includes transmitting, by a first node in a wireless network, a first preamble. The method also includes detecting, in parallel with transmitting the first preamble, a transmission of a second preamble. A second node in the wireless network transmits the second preamble. Additionally, the method includes determining a later start between the transmission of the first preamble and the transmission of the second preamble. The method further includes terminating transmission of the first preamble if the determining indicates that the transmission of the first preamble started after the transmission of the second preamble.

The claimed subject matter provides an additional method for wireless communication. The additional method includes transmitting an acknowledgement preamble for a received data packet. Further, the method includes determining that the data packet comprises an error, in parallel with, transmitting the acknowledgement preamble. The method also includes terminating transmission of the acknowledgement.

Additionally, the claimed subject matter includes a computer-readable storage media. The computer-readable storage media includes code configured to direct a processing unit to perform a transmission of a first preamble during a clear channel assessment of a wireless network. A first node in the wireless network transmits the first preamble. Additionally, in parallel with the transmission of the first preamble, a plurality of transmissions of a corresponding plurality of preambles is detected. A corresponding plurality of nodes in the wireless network transmits the preambles. A later start is determined between the transmission of the first preamble and any of the plurality of transmissions of the corresponding plurality of preambles. The transmission of the first preamble is terminated if the determining indicates that the transmission of the first preamble started after the transmission of the second preamble.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
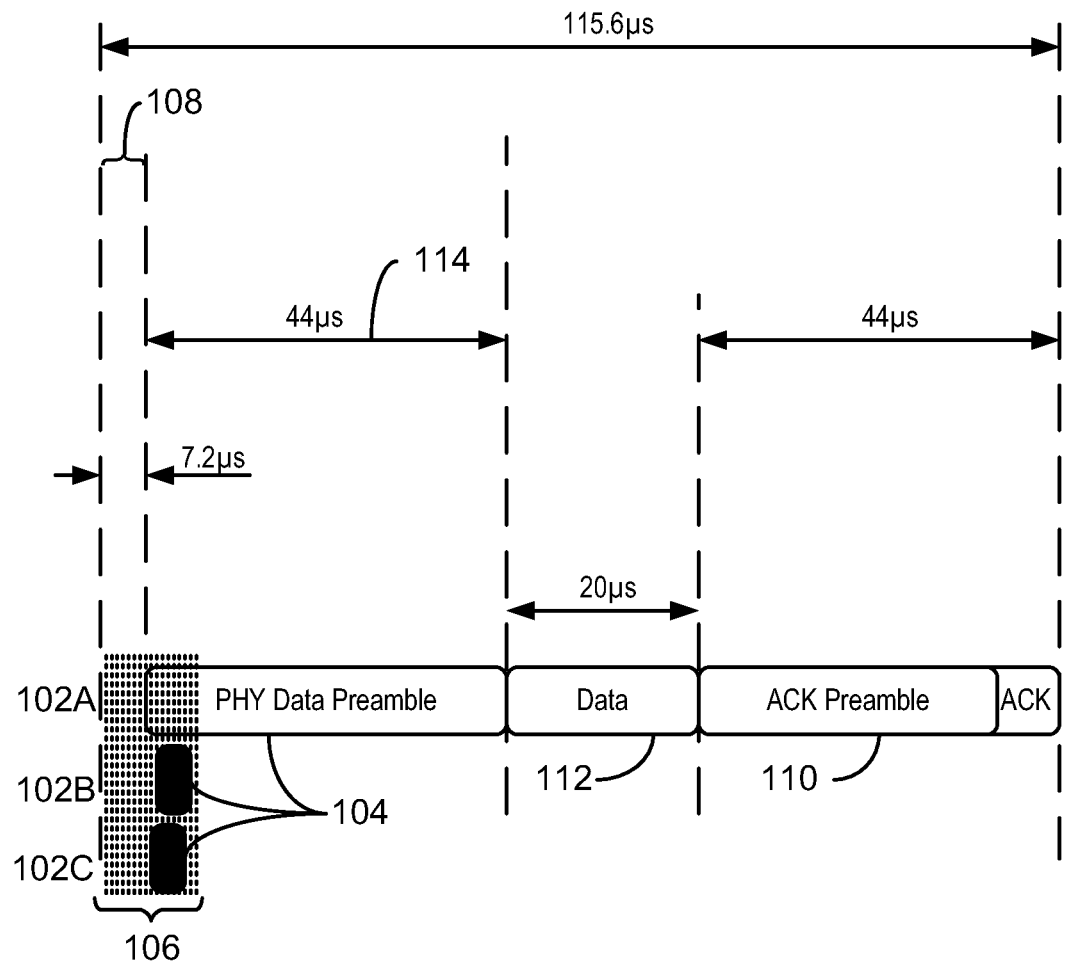
FIG. 1 is a timeline of three nodes operating in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Wi-Fi communications incur several overheads: channel access, data preamble, and acknowledgement (ACK). In the following discussion, Wi-Fi communications are discussed with reference to a single node transmitting 1500 byte data packets, using 802.11n at 600 Mbps. The discussed example also involves the use of the distributed coordination function (DCF) with RTS/CTS turned off. It is noted that embodiments of the claimed subject matter may leave RTS/CTS on, and use other transmission rates, data packet sizes, and protocols.

Channel access overhead is the idle time before a node begins transmitting a data packet. Channel access includes a clear channel assessment (CCA) and a backoff counter. CCA is also referred to herein as carrier sensing. Before transmitting a data packet, a node performs carrier sensing to determine that a channel is available for communication. Typically, the node determines that a channel is available by remaining idle for the duration of DCF Interframe Space (DIFS). DIFS includes a short interframe space (SIFS) of 16 µs and two slots (each 9 µs), totaling 34 µs. A slot is a fixed slice of time used for backoff counting. According to the 802.11n standard, a slot is 9 µs.

After DIFS, the node typically defers transmission for a period of time according to a backoff counter. The backoff counter is a technique in which a node waits for a random number of slots to pass before transmitting. Each node in a network selects a random number in order to share the available channel fairly. The random number may range from 0, to the size of the contention window (CW) minus one. According to the 802.11n standard, the minimum value of the CW is 16 slots. As such, there may be an average of 7.5 slots in the backoff counter. Accordingly, channel access overhead may average 101.5 µs:34 µs for DIFS, plus 67.5 µs for an average of 7.5 slots. Accordingly, channel access overhead amounts to more than 500% of the transmission time of the payload.

Data preamble overhead includes the time spent transmitting a physical layer preamble, which precedes the transmission of data in every packet. The preamble is used to prepare the receiver for a successful reception. The preamble aids packet detection, whereby the receiver may reliably establish that a packet is being transmitted. The preamble also enables synchronization, where the receiver detects the boundaries of various parts of the packet to enable decoding. Additionally, the preamble enables channel estimation. Channel estimation helps combat the vagaries of the wireless environment by providing sufficient information to allow the receiver to estimate and correct for the channel characteristics. Further, for 802.11n multiple-input and multiple-output (MIMO) reception, the preamble enables the receiver to estimate parameters used to allow leveraging the spatial orthogonality of multiple streams. For the 802.11a/g standards, in 20 MHz channels, preambles are 20 µs long (including Physical Layer Convergence Procedure (PLCP) header). For 4×4 802.11n, which provides for wireless devices with multiple transmitting and multiple receiving antennas, preambles are 40 µs long. As such, the data preamble overhead ranges from 100-200% of transmission time of the payload. It is noted that embodiments of the subject matter may be applied, mutatis mutandis, to different channel widths, where preambles have different sizes.

ACK overhead includes the time spent when a receiving node acknowledges receipt of a packet. Upon the successful reception of a packet, the receiver responds with an ACK. To allow enough time for the receiver to process incoming data and prepare its radio for transmitting the ACK, a node waits for SIFS (16 µs) before transmission. The ACK content includes only 14 bytes, which takes approximately 18 ns to transmit at 600 Mbps. However, because the 802.11n standard uses 4 µs symbols, all packet transmission durations span multiples of 4 µs. The ACK packet is accordingly padded with zeros to fill out 4 µs of data. Further, the ACK also includes a preamble of 40 µs. Thus, ACK overhead (SIFS and ACK together) spans 60 µs, approximately 300% of the transmission time of the data payload.

In one embodiment, a wireless communications protocol may be used that reduces overhead for channel access and acknowledgement by an order of magnitude over the current 802.11 standards. Such an embodiment may reduce these overheads by speculatively transmitting preambles during CCA. In this way, nodes may contend for a channel while transmitting preambles in parallel, thereby mitigating channel access overheads. The parallel transmission and detection of preambles may enable the reduction of the slot length. Speculative transmission of the ACK preamble may similarly reduce ACK overhead.

The channel access overhead, preamble overhead, and acknowledgement overhead are incurred for all Wi-Fi communications, including communications for a single node. However, when several nodes contend for the channel, another overhead may be incurred when packet collisions occur. As a result of each collision, the corresponding data packet is re-transmitted. Accordingly, each collision results in an overhead equal to the time used for re-transmitting the packet.

All of these overheads contribute to reduced efficiency in Wi-Fi communications. However, since channel access overhead is dependent on slot size, reducing the slot size may further improve the efficiency of Wi-Fi. Additionally, collision overhead may be reduced by increasing the size of the CW. In an embodiment of the claimed subject matter, the slot size may be reduced to a size not smaller than twice the propagation delay of the wireless network. Maintaining a slot size greater than twice the propagation delay may maintain the fairness of the network.

FIG. 1 is a timeline 100 of three nodes, 102A-C, operating in accordance with the claimed subject matter. According to the timeline 100, nodes 102A-C may speculatively transmit their preambles 104 in one of the slots 106 where their backoff counters expire. In such an embodiment, preamble detection may take multiple slots 106. As such, a node 102 may detect preambles 104 transmitted by other nodes 102 in parallel with transmitting its own preamble 104. To transmit and receive in parallel, the nodes 102 may be equipped with an extra oscillator and antenna. Additionally, the nodes 102 may detect others' preambles by using analogue self-interference cancellation. Self-interference cancellation enables each node 102 to remove the effect of its transmission before performing preamble detection on a received signal. To perform self-interference cancellation, the nodes 102 may be equipped with a noise canceller circuit.

As nodes 102B, 102C detect the preamble transmitted from node 102A, nodes 102B, 102C terminate their own transmissions. In this way, channel access overhead may be reduced by eliminating the SIFS delay from the DIFS, and reducing slot duration from 9 microseconds (μs) to smaller values, such as 800 nanoseconds (ns). Thus, average time spent for channel access 108 may be reduced to 7.5 slots+DIFS. This is equivalent to 9.5 slots at 800 ns per slot, for a total of 7.6 μs. This is an order of magnitude lower than the average 101.5 μs spent during channel access in Wi-Fi. It is noted that the slot duration of 800 ns is merely used as an example. Other slot durations may be used.

In addition to reducing channel access overhead, speculative preamble transmission may also be used to reduce the ACK overhead. In an embodiment of the claimed subject matter, the receiver of the transmission of node 102A may speculatively transmit the ACK preamble 110 as soon as the node finishes reception of data 112. While the ACK preamble 110 is being transmitted, the node 102 may finish decoding the data 112 in parallel. Upon detecting an error in reception, the node 102 may terminate the ACK transmission. By transmitting the ACK preamble as a received data packet is processed to identify errors, the SIFS delay may also be eliminated. According to the 802.11 standard, a SIFS of 16 μs is designed to accommodate delays, such as transferring the received signal from the antenna, MAC processing, and the time to switch from receive to transmit mode. However, because the nodes 102 have separate transmit and receive paths, ACK preamble may be speculatively transmitted as soon as reception is complete. The receiver of the transmission of node 102A may then, in parallel, decode the received data packet and compute the cyclical redundancy check (CRC) to check for errors. Upon detection of any error, the nodes 102 terminate the speculative ACK preamble transmission. Since preamble length at even 802.11a rates is 20 μs, there is ample time for processing and terminating ACKs. Further, speculatively transmitting ACKs may be performed without full-duplex capability.

In an embodiment, a lattice correlator may be used to enable speculative preamble detection. The lattice correlator may be capable of detecting sub-parts of a pseudo-random preamble 104. The lattice correlator may also allow the nodes 102 to accurately estimate the transmission start time of detected preambles. This estimate may enable the detecting node to roll back its backoff counter to the estimated start time, which may preserve fairness in channel access. Fairness describes a principle for access, where, given a certain idle channel duration, all nodes 102 in the network may count identical numbers of idle slots. In case one node, e.g., 102A has a chance to count more idle slots than another node 102B, the node 102A may have more chances to access the medium.

Performing preamble detection in parallel with preamble transmission may provide several advantages. First, packet collisions due to an identical choice of backoff counters by multiple nodes 102 may be reduced. For example, if two or more nodes 102 initiate their preamble transmission in the same slot 106, these nodes 102 may be able to determine each other's start times, and deduce that a collision is imminent. In such a case, the nodes 102 may probabilistically terminate transmission of their preambles 104 such that, with high likelihood, only one node 102 continues to transmit. Second, since the likelihood of backoff counter collisions is reduced, unfairness caused by a capture-effect between near-and-far terminals may be eliminated. A capture-effect describes a scenario when a node A far from the access point (AP), and node B close to the AP, start transmitting in the same slot. In such a scenario, the transmissions overlap at the AP. As such, it is likely that the AP can decode the packet from node B (which has a higher signal strength) correctly. In contrast, the packet from node A may be considered noise. In such a case, node A is considered unfavored with respect to node B. This can happen independently of which packet arrives first.

The speculative transmission of preambles 104 may cause interference between the nodes 102. As such, preamble detection time may take longer in comparison to Wi-Fi. However, due to an avalanche effect triggered during channel access 108, the preamble detection time may only be about 4 μs longer than in WiFi. The avalanche effect may describe the acceleration of terminated transmissions, as nodes 102 discover other speculative preamble transmissions. As shown, the preamble transmission time 114 is only 44 μs.

As described in 802.11 standard, the use of 9 μsec slots stems from four delays—time to carrier sense, Rx-Tx switching time, speed of light propagation, and MAC processing delay. While 802.11 recommends nominal values for each of these delays, individual manufacturers are free to choose these delays based on their specific hardware capabilities and constraints. However, the sum of these delays contribute to a slot duration of 9 μs.

Time to carrier sense involves detecting transmissions from other nodes. Typically, before initiating transmission in the current slot, a node reliably establishes that no other transmissions were initiated in the previous slot. A failure to do so results in packet collisions. Further, given the vagaries of noise and interference, the time to ascertain the presence or absence of an ongoing transmission depends on signal to interference ratio (SINR) at the receiver. The 802.11 standard recommends 4 μs to enable reliable carrier sensing from the farthest nodes in the network.

Rx-Tx switching time includes the time to switch a node between receiving and transmitting. Given that Wi-Fi devices typically do not perform parallel transmission and reception, several components of a node, such as the antenna and the radio frequency (RF) oscillator are shared between the transmission and reception circuits. As such, a node takes time to switch from reception to transmission mode in order to reset these shared components. The 802.11 standard regarding orthogonal frequency-division multiplexing (OFDM) recommends an RxTx turnaround time <<2 μs.

Speed of light propagation includes the time for radio signals to travel from the farthest reaches of the network. RF waves travel a distance of 100 meters (m) in approximately 330 ns. Thus, if two devices are 100 m apart, their carrier sensing and perception of slot boundaries may be 330 ns apart. Slots accommodate these delay effects due to propagation delays. Here, the 802.11 standard regarding OFDM recommends an AirPropagationTime<<1 µs.

The MAC processing delay includes the time for the physical communications layer to be processed by the MAC layer. Additionally, the MAC issues signals to the physical layer. The MAC processing delay may vary depending on specific hardware implementations.

Figure 2:
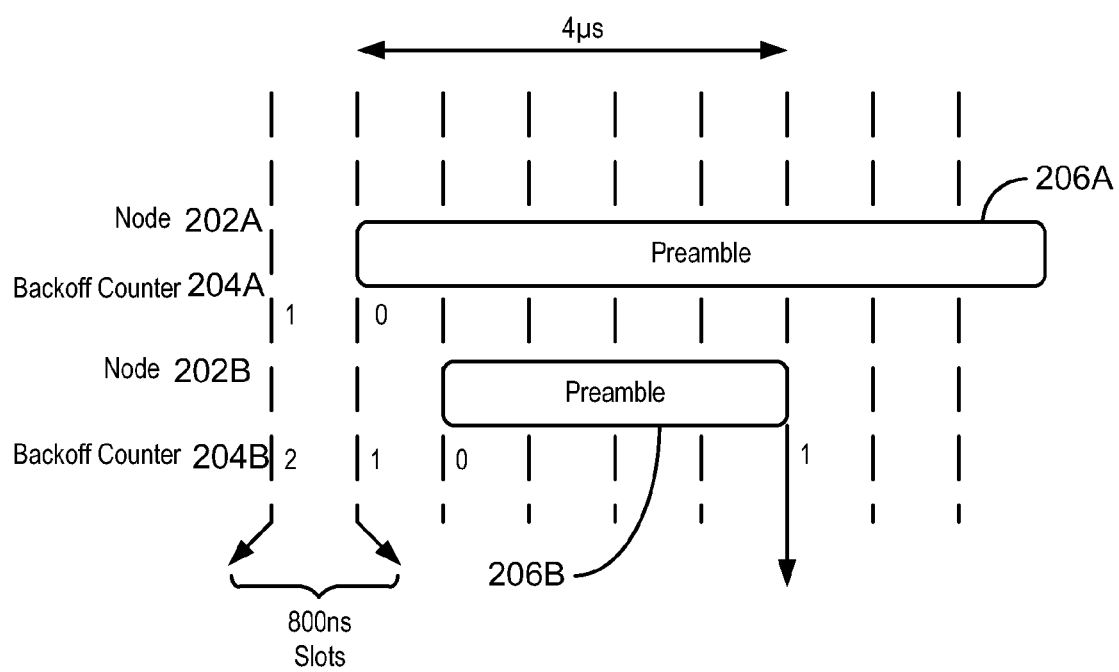
FIG. 2 is a timeline for two nodes operating in accordance with the claimed subject matter.

An embodiment of the claimed subject matter WiFi-Nano removes the dependency of slot duration on time to carrier sense by having nodes carrier sense in parallel with speculatively transmitting data preambles. FIG. 2 is a timeline 200 for two nodes 202A, 202B operating in accordance with the claimed subject matter.

The nodes 202A, 202B may contend for the same channel. For the sake of simplicity, in this example, it is assumed that the nodes 202A, 202B take 4 µs to detect each other's transmissions. As shown, node 202A finishes counting down its backoff counter 204A and initiates its transmission before node 202B. Node 202B finishes counting down its backoff counter 204B one slot (800 ns) after node 202A. Because node 202B takes 4 µs to detect node 202A's transmission, node 202B is unable to detect A's transmission at the time node 202B's transmission begins. However, instead of waiting to detect the other transmission, node 202B initiates its transmission by speculatively transmitting its preamble 206B. Given the capability that node 202B can carrier sense while transmitting, node 202B eventually detects node 202A's transmission four slots later. Node 202B may then determine that the node 202A started transmitting prior to node 202B. Consequently, node 202B determines that it cannot be the rightful owner of the medium and terminates its preamble transmission before completing. Node 202A, on the other hand, continues its own transmission uninterrupted. Thus, by enabling carrier sensing while transmitting by using speculative transmission of preambles, CCA may be performed in parallel with preamble transmissions. As such, channel access overheads may be masked under the preamble overheads. Additionally, slot duration is not constrained to be greater than the time to carrier sense.

In order to enable carrier sensing while transmitting preambles, an embodiment may use self-interference cancellation. To prevent a node's own transmissions from overwhelming its receiver, the transmitted signal from the transmitting antenna may be subtracted from the received signal at the receiver antenna. In this way, the interference due to a node's own transmission may be mitigated. Further, to increase the robustness of detection, embodiments may allow a longer carrier sensing time without affecting slot duration, and hence, the efficiency significantly.

Even though node 202B terminates its transmission, it is in a position of advantage with respect to its backoff counter value. This is because if node 202B had not experienced any delay in carrier sensing, the node 202B would have suspended its backoff counter at 1 as soon as node 202A initiated its transmission. Accordingly, in order to preserve fair access, aborting nodes may roll back their backoff counters to the time of initiation of the transmission that wins the contention, i.e., node 202A's transmission. The roll-back mechanism is described in greater detail with respect to FIG. 6.

Having the nodes 202A, 202B perform carrier sensing while transmitting eliminates the Rx-Tx switching delay because the receiver and transmitter are operating in parallel at any given time. Further, because MAC processing overheads only result in delayed speculative transmissions that may be aborted, they may be excluded from the slot duration. Consequently, the only remaining contributor to the slot duration is the propagation delay.

In order to preserve fairness, nodes may roll back their backoff counters to the time of initiation of the transmission that grabs the channel. However, propagation delays may cause an incorrect estimation of this time. Specifically, if slot sizes are less than twice the maximum propagation delay of the network, this incorrect estimation may result in an unfair sharing of the communication channel.

Figures 3A, 3B:
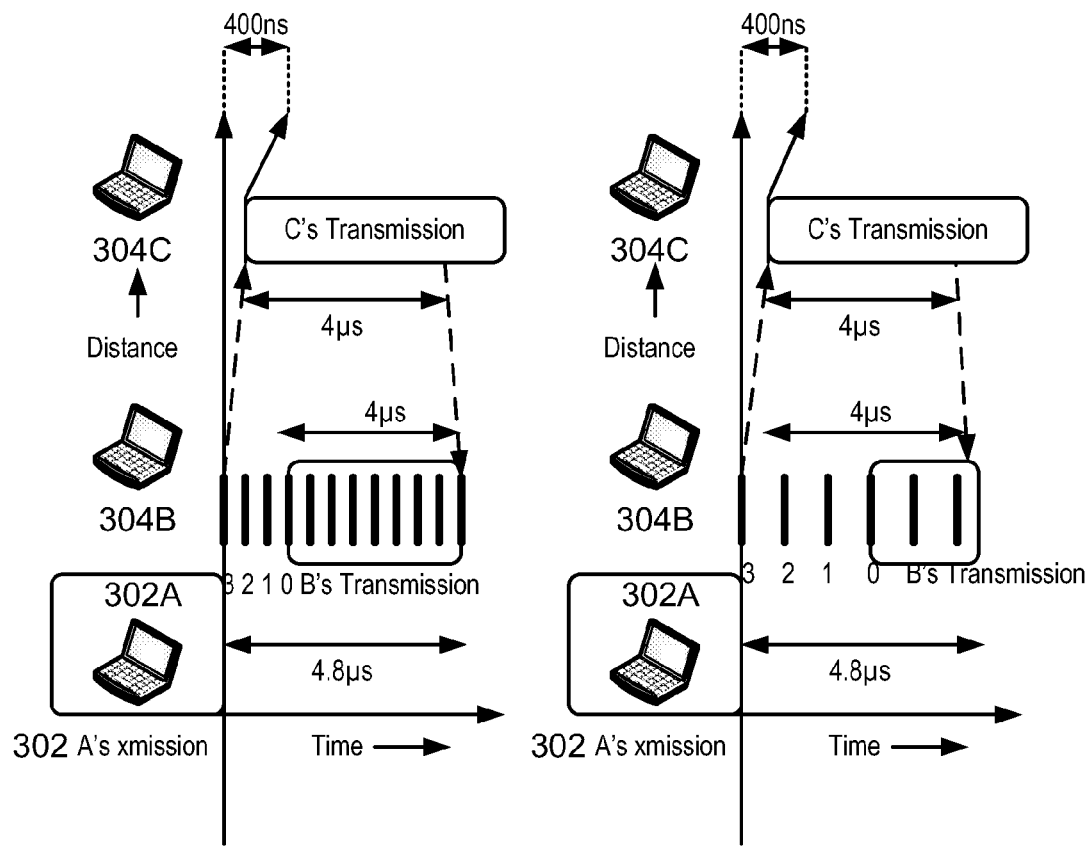
FIG. 3A is a timeline for an example wireless network with a slot size less than the propagation delay.
FIG. 3B is a timeline for an example wireless network with a slot size greater than twice the propagation delay.

For example, FIG. 3A includes a timeline 300A for an example wireless network with a slot size less than the propagation delay. The wireless network may include an access point, 302A, and two nodes: 304B and 304C. The node 304B may be significantly closer to access point 302A than node 304C. As shown, the node 304B may detect that the channel is idle immediately, and start counting down its backoff counter. Meanwhile, the node 304C may not detect that the channel is idle until at least one slot time later, due to the propagation delay. If node 304C's backoff counter has a value of zero, node 304C may start transmitting a packet at its slot zero, i.e., when it realizes the channel is idle. Node 304B may determine that the transmission of the preamble of node 304C started after node 304B has counted down at least one more slot. Thus, node 304B is able to advance its backoff counters by an additional two slots compared to node 304C, thereby obtaining higher throughput, on average.

However, this unfairness may be avoided where slot size is greater than twice the propagation delay. For example, FIG. 3B includes a timeline 300B for an example wireless network with a slot size greater than twice the propagation delay. Both nodes 304B and 304C may detect the channel is idle and start counting down. Again, node 304C may start transmitting at its slot zero. Because the larger slot size accommodates the propagation delay between nodes 304B and 304C, node 304B may determine that the transmission of the preamble of node 304C started at its slot 0, and roll back its backoff counter to its initial value, i.e., 3. Thus, a minimum slot size greater than twice the propagation delay may maintain fairness. The propagation delay of a typical indoor wireless network with a 100 meter range may approach 333 ns. Accordingly, in an embodiment of the claimed subject matter, the slot size may be 800 ns. It is noted that the claimed subject matter may be applied for longer ranges using 800 ns or different slot sizes; however, in the former case, the farther nodes may suffer from unfairness.

Figure 4:
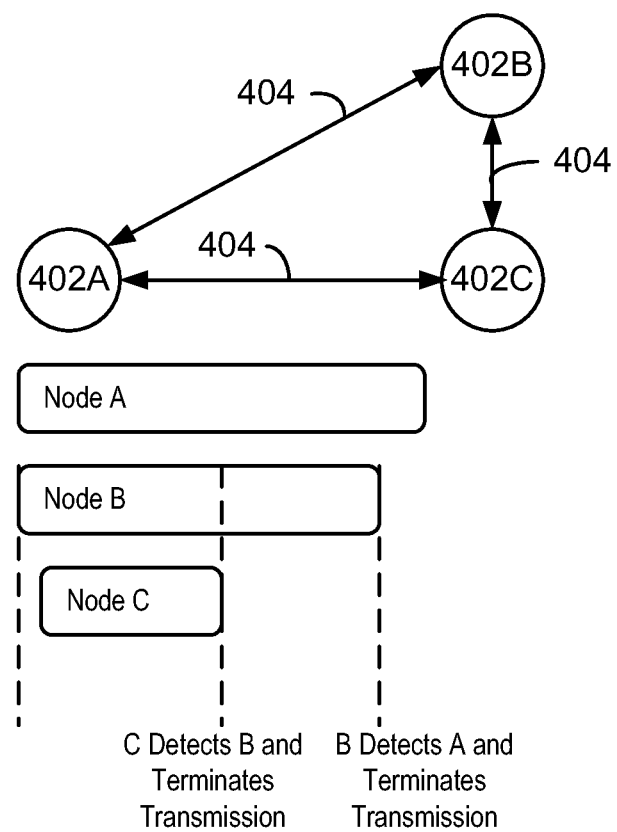
FIG. 4 is a block diagram of a wireless network in accordance with the claimed subject matter.

While parallel transmission and carrier sensing may reduce channel access overhead, it may also cause chained contention. FIG. 4 is a block diagram of a wireless network 400 in accordance with the claimed subject matter. The network 400 includes nodes 402A, 402B, and 402C, in communication over links 404. Nodes 402B and 402C may be proximate to each other. However, node 402A may be distant from both 402B and 402C. Accordingly, the received signal strength (RSS) between nodes 402 B and 402C may be −45 dBm. Further, the RSS between nodes 402A and 402C may be −85 dBm. The RSS between nodes 402A and 402B may have a similar value. If node 402A starts to speculatively transmit first, followed by nodes 402B, then 402C, then node 402A's transmission at node 402B may be overwhelmed by the transmission from node 402C. Accordingly, the transmission of node 402A may have an SINR, at node 402B, of −40 dB (−85 dBm−(−45 dBm)). Similarly, at node 402C, node 402A's transmission may be overwhelmed by the transmission from node 402B. It may be that an SINR of 10 dB enables the reliable detection of node 402A's transmission. As such, a processing gain of about 50 dB for the preamble transmitted by node 402A enables nodes 402B, 402C to detect node 402A's transmission reliably. The preamble length for achieving a processing gain of 50 dB is 100000, which translates to a preamble that is 5 ms long, an impractically long time. However, if nodes 402B and 402C are not continuously transmitting, reliable detection may be achieved without such a long preamble. Because nodes 402B and 402C are proximate to each other, aided by self-interference cancellation, the nodes 402B, 402C receive each other's transmissions with a very high SINR, approximately 40 dB. Thus, nodes 402C may detect node 402B's transmission in a very short time, and terminate its transmission. Once node 402C terminates its own transmission, a processing gain of only 10 dB may enable node 402B to detect node 402A's preamble.

Figure 5:
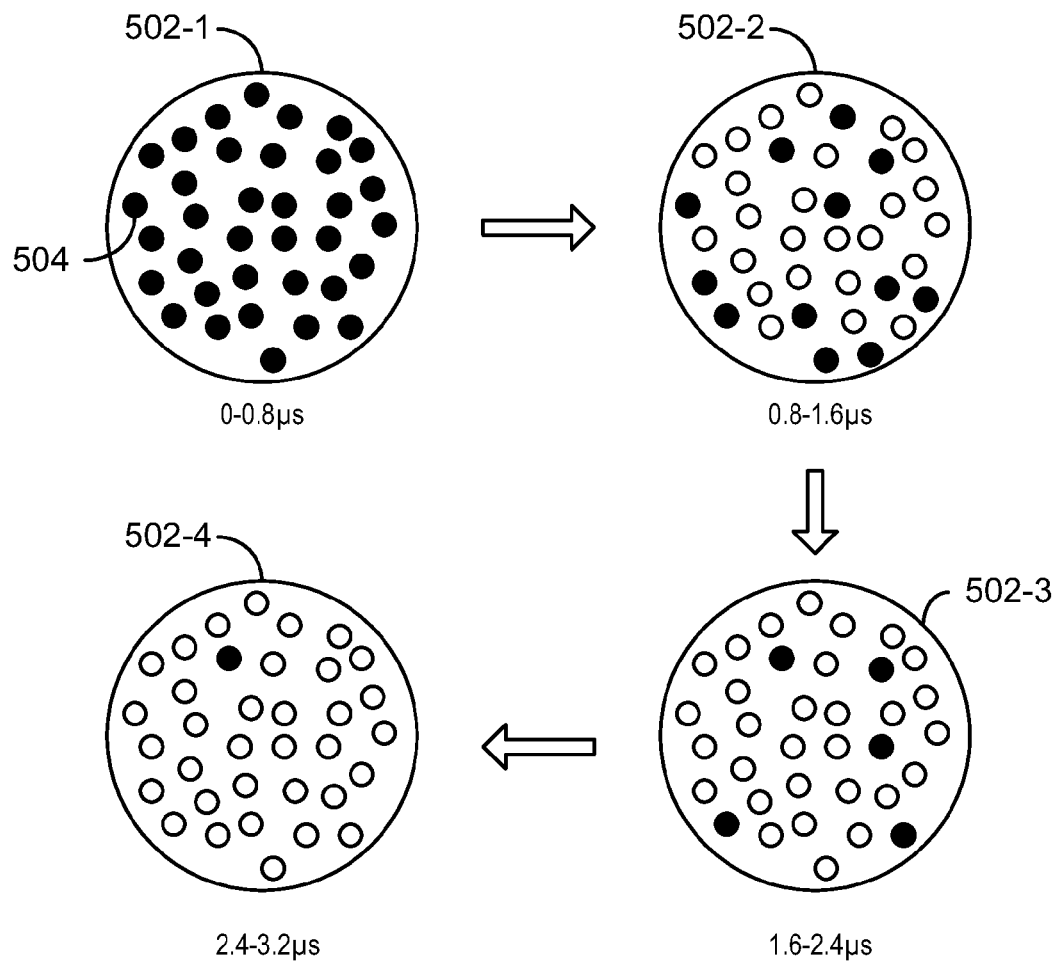
FIG. 5 is a diagram of a sequence of transmission scenarios in a dense deployment environment, in accordance with the claimed subject matter.

In a dense deployment environment, several nodes initiate their transmissions speculatively, leading to a high interference environment. However, as proximate devices detect each other and terminate their transmissions, the ability to detect transmissions from more distant nodes improves. Thus, as time progresses, more and more nodes terminate their transmissions in a chain-reaction-like manner, expanding in geographical extent. FIG. 5 is a diagram of a sequence of transmission scenarios in a dense deployment environment, in accordance with the claimed subject matter. Each large circle represents a stage of transmissions, in 0.8 μs increments. Stage 502-1 represents the nodes from time 0.0-0.8 μs. Stage 502-2 represents the nodes from time 0.8-1.6 μs. Stage 502-3 represents the nodes from time 1.6-2.4 μs. Stage 502-4 represents the nodes from time 2.4-3.2 μs. Each of the small circles, light and dark, represent nodes 504 in the dense deployment environment. The dark circles represent nodes 504 that are speculatively transmitting preambles. The light circles represent nodes 504 that are not transmitting. As shown, at stage 502-1, all nodes 504 are speculatively transmitting preambles. At each subsequent stage, more nodes 504 terminate their transmission due to detection of other transmitting nodes, until stage 502-4, when only one node 504 continues to transmit. The inherent parallelism of chained contention resolution in embodiments of the claimed subject matter may resolve all contentions in such an environment. However, because of the lower SINR in such an environment, a larger preamble may be used than that of a typical Wi-Fi environment.

The detection of transmission by other nodes is typically performed in a correlation process. In correlation, pseudo-random noise (PN) sequences included at the beginning of preambles are correlated with received signals. Because embodiments of the claimed subject matter transmit the preamble in multiple slots, a sub-preamble lattice correlator may be used. The lattice correlator correlates sub-parts of a preamble. For example, referring back to FIG. 4, after node 402C terminates, node 402B is able to correlate only on the part of 402A's preamble that was received after node 402B terminated its transmission.

In general, when several nodes contend for a channel, the correlation may be performed on different lengths and parts of the preamble. Further, detection of sub-parts of the preamble allows the earliest possible detection, and hence, allows terminating transmission at the earliest possible time. Additionally, the lattice correlator may detect the exact position of the correlation, which enables the accurate determination of the beginning of the packet transmission.

Figure 6:
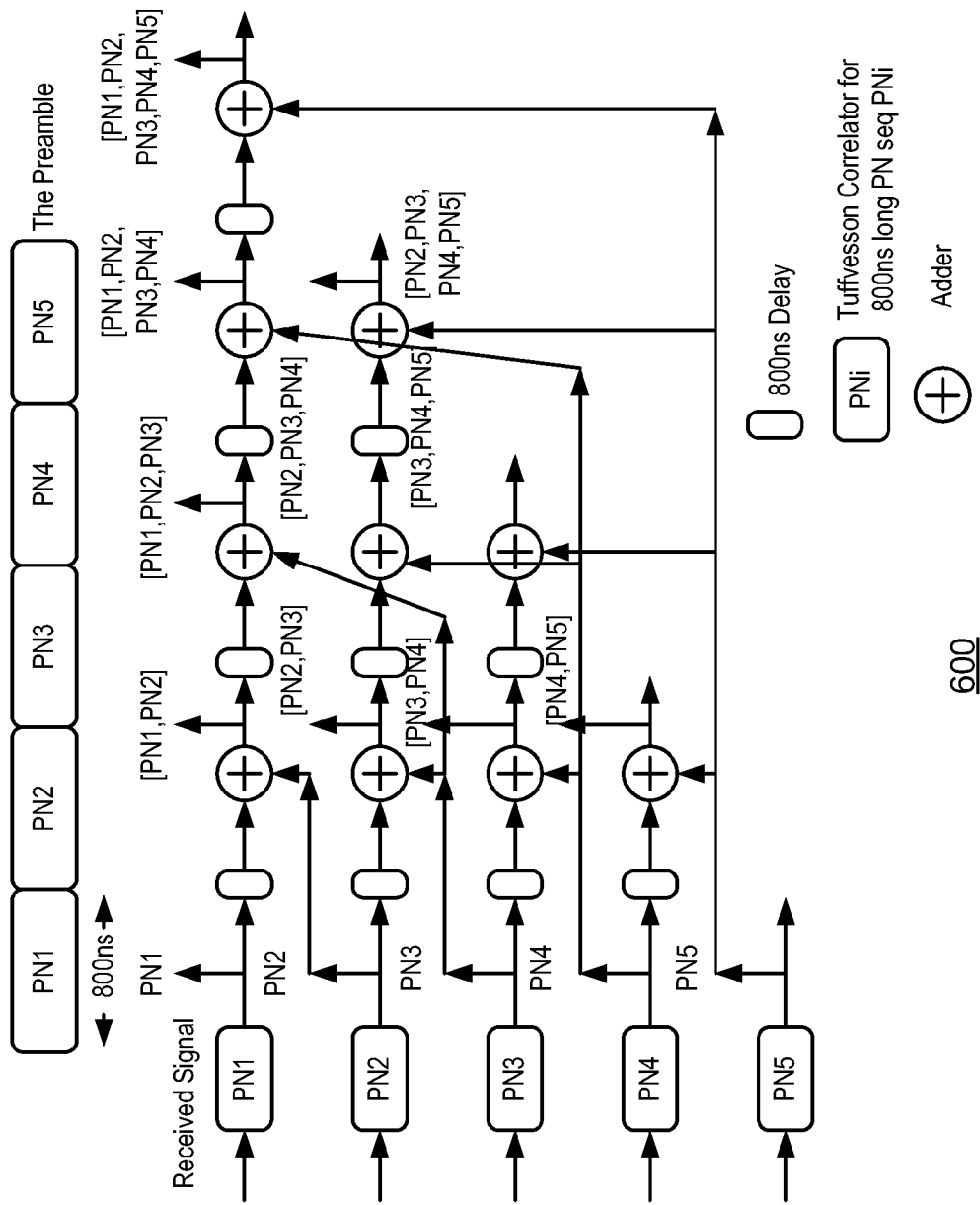
FIG. 6 is a block diagram of a sub-preamble lattice correlation in accordance with the claimed subject matter.

FIG. 6 is a block diagram of a sub-preamble lattice correlation in accordance with the claimed subject matter. In order to enable these functionalities, each packet is preceded by a PN sequence comprising several short but distinct 800 ns PN sequences PN1, PN2, ..., PNn. The lattice correlator takes as input, the received signal and generates $$\frac{N(N-1)}{2},$$

(N is the number of 800 ns PN sequences) outputs corresponding to the correlations obtained from each continuous sub-part of the preamble e.g., [PN1, PN2], [PN3, PN4, PN5] etc. Detection of a spike in any of these inputs provides two pieces of information: the presence of an ongoing transmission, and the time of the beginning of the reception. The time of the beginning of the packet reception is determined by the position of the last 800 ns PN sequence. For example, a spike due to the correlation [PN2, PN3, PN4] indicates that the packet reception started 4*800 ns=3.2 μs ago. While stronger transmissions are typically detected in the early stages of the lattice correlator, weaker signals may be detected at later stages.

Upon detecting a spike, the beginning time of this reception may be determined. Accordingly, the detecting node may then terminate its current transmission if the reception began in an earlier slot than the detecting node. If the reception began in the same slot where the detecting node began transmitting, the transmission may be terminated probabilistically. Once the detecting node decides to terminate, the backoff counter may be rolled back to a value corresponding to the difference between the beginning of its own transmission and the beginning of transmission of the detected signal. However, even after a node terminates its transmission, the node continues to monitor spikes from the lattice correlator. Monitoring further spikes from the lattice correlator enables the node to update its backoff counter to reflect an earlier transmission of a weaker signal that was detected at a later stage of the preamble.

Since potential collisions can be detected in each 800 ns slot, collisions may be resolved probabilistically. In a scenario with two colliding nodes, probabilistic resolution allows for one node to terminate its transmission instead of both, thereby reducing collision overhead. For example, rather than both nodes aborting their transmissions, they could instead continue their transmissions with a probability of 50% after perceiving a potential collision. Thus, in the next 800 ns slot, with 50% probability one node wins sole access to the channel. However, this leaves a 25% probability that both nodes terminate. In such a case, a new contention resolution phase can begin. Similarly, there is a 25% probability that both nodes decide to continue transmitting. In such a case, the probabilistic collision resolution process continues again in the next slot. In this way, eventually either both nodes terminate or only one continues transmitting with high probability, thereby winning sole access to the channel.

When more than two nodes collide in a given slot, the number of collisions can be approximately estimated by the number of correlation spikes that occur within a single 800 ns slot. This is due to the fact that the slot boundaries of different nodes are not perfectly aligned due to differences in propagation delays. However, upon detecting k−1 distinct spikes in a single slot, rather than a 50% probability, each node may continue transmitting with a probability of 1/k. Thus, the probabilistic collision resolution mechanism avoids payload collisions with high probability, thereby significantly reducing the collision overhead.

An embodiment of the claimed subject matter may be implemented on a digital signal processor/field-programmable gate array (DSP/FPGA)-based software-defined radio platform. In such an embodiment, operations may be performed at latencies of hundreds of ns. Further, the entire MAC layer logic, the lattice correlator, the logic for terminating transmissions, and backoff rollback may be implemented on the FPGA. The clock speed of the FPGA may be set to 40 MHz, giving a clock cycle of 25 ns for performing operations. Three aspects of the claimed subject matter: preamble detection, efficiency, and fairness were evaluated on such an embodiment. Reliable preamble detection is useful for the performance of the claimed subject matter because missed detections may lead to collisions. On the other hand, false detections lead to unnecessary backoffs, and hence, a loss of efficiency.

Figure 7:
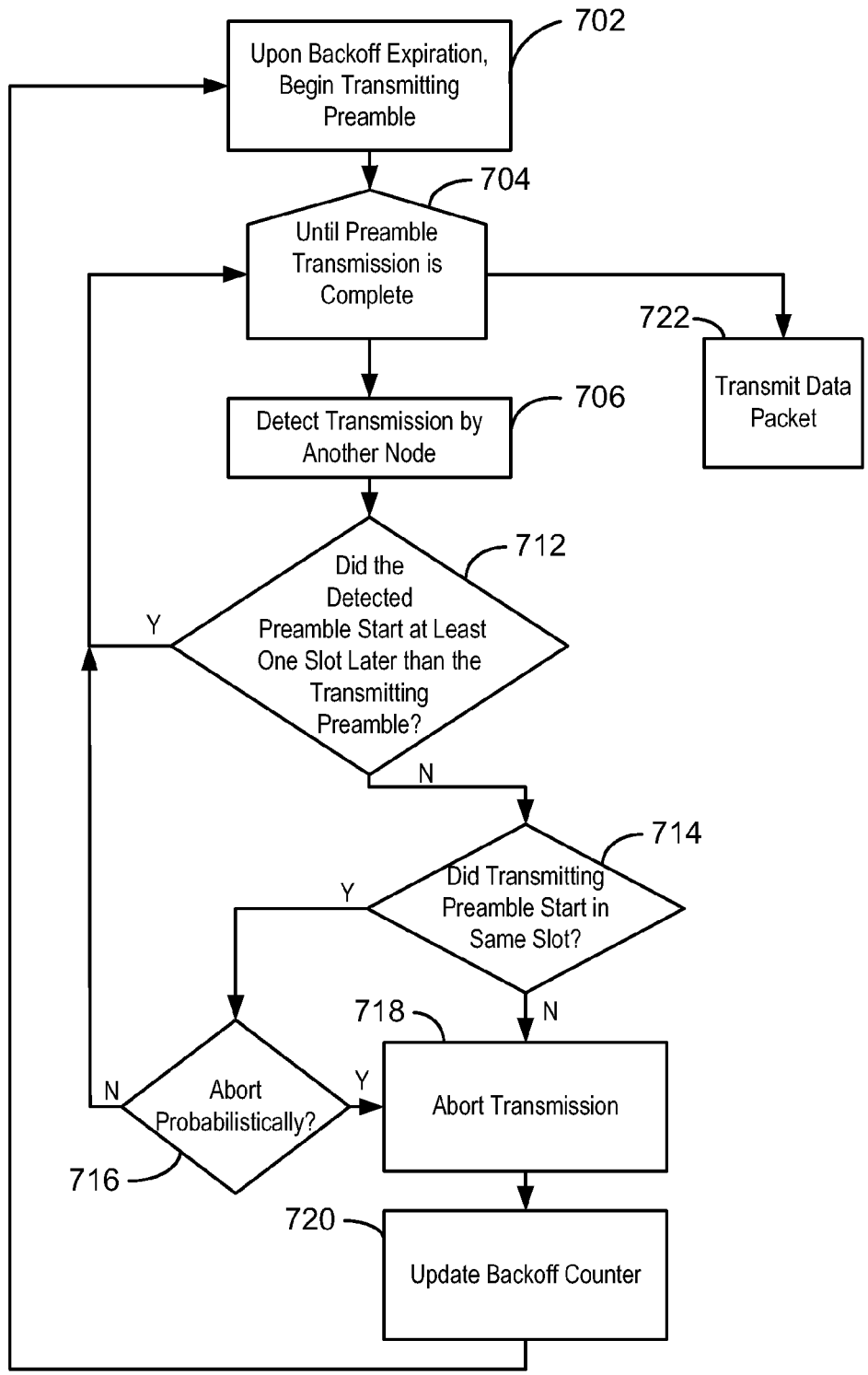
FIG. 7 is a process flow diagram of a method for wireless communication in accordance with the claimed subject matter.

FIG. 7 is a process flow diagram of a method 700 for wireless communication in accordance with the claimed subject matter. It is noted that the process flow diagram is not intended to indicate a particular order of execution. At block 702, a node begins transmitting a preamble upon expiration of its backoff counter. The preamble may be transmitted in preparation for the transmission of a data packet. Blocks 704-716 may be repeated until the preamble transmission is complete. Once the transmitting node completes transmitting its preamble, control flows to block 722, where the transmitting node transmits the data packet. However, during transmission, control flows to block 706, where the transmitting node may detect transmission of a preamble by another node in the wireless network. The detection is performed in parallel with the transmission. Control may also return to block 704 if no transmission is detected.

At block 712, the transmitting node may determine whether the detected preamble started at least one slot later than the transmitting preamble. The start of the detected preamble may be the starting transmission time as perceived by the transmitting node. In other words, the start may be the actual starting time plus the propagation delay. If the detected preamble did start at least one slot later, control flows to block 704, and the transmission of the transmitting node's preamble continues. If the detected preamble did not start transmitting at least one slot later than the transmitting preamble, control flows to block 714.

At block 714, the first node may determine whether the transmitting preamble started in the same slot as the detected preamble. If so, at block 716, the transmitting node may determine, probabilistically, whether to abort. If the determination is made not to abort, control flows back to block 704, where transmission of the transmitting node's preamble continues. If the determination is made to abort, control flows to block 718, where the transmitting node aborts transmission of its preamble. If the transmitting preamble did not start transmitting in the same slot as the detected preamble, control may also flow to block 718, where the transmission is aborted. At block 720, the transmitting node may update its backoff counter, if needed. Control may flow to block 702 when the transmitting node begins transmitting the preamble again.

Figure 8:
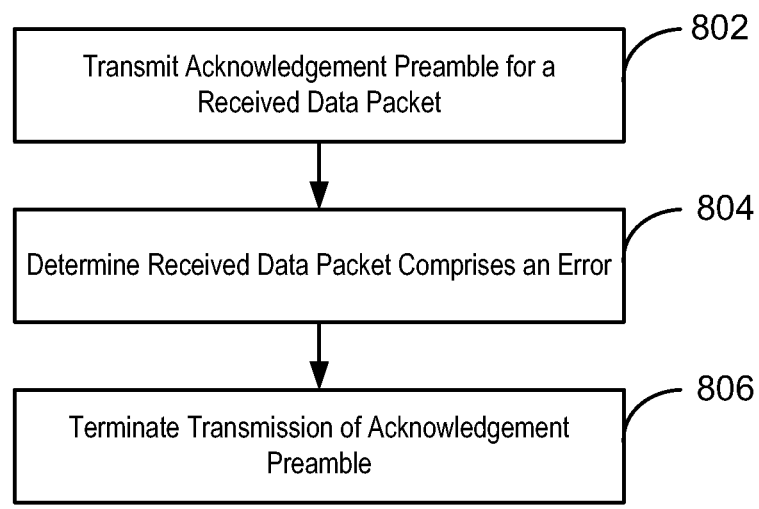
FIG. 8 is a process flow diagram of a method for wireless communication in accordance with the claimed subject matter.

In addition to transmission of data packets, nodes may also receive data packets. In one embodiment, a method for wireless communication may include acknowledging the receipt of data packets. FIG. 8 is a process flow diagram of a method 800 for wireless communication in accordance with the claimed subject matter. The method 800 begins at block 802, where a node may transmit an acknowledgement preamble for a received data packet. At block 804, the node may determine that the data packet contains an error. The determination is performed in parallel with the transmission of the acknowledgement preamble. Due to the error, at block 806, the first node may terminate transmission of the acknowledgement preamble.

Figure 9:
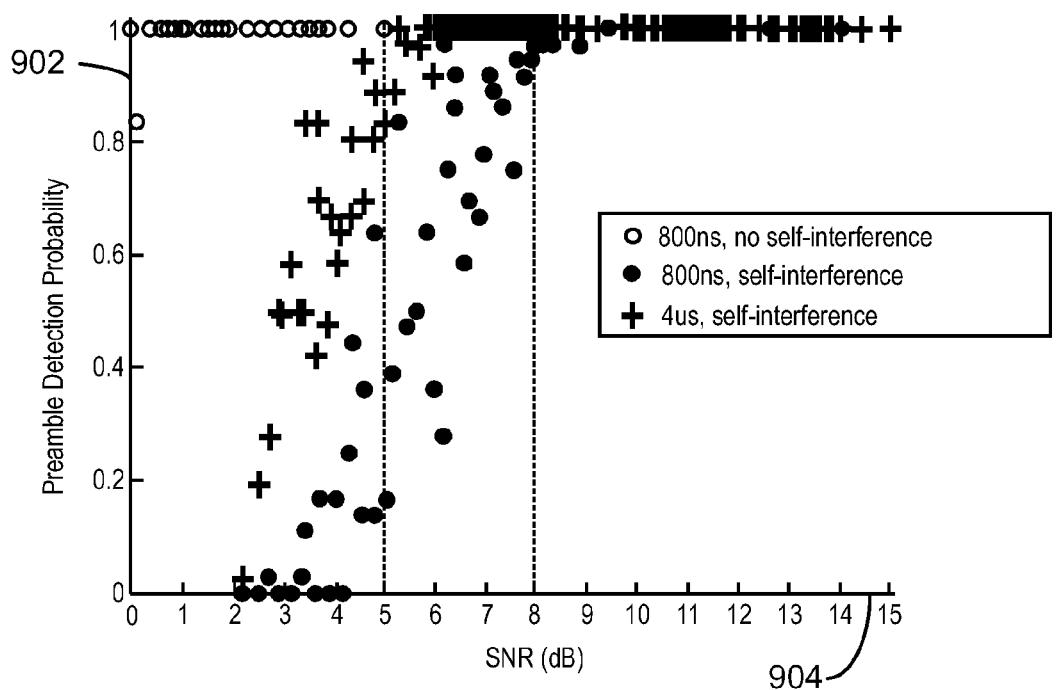
FIG. 9 is a graph depicting the reliability of an embodiment in accordance with the claimed subject matter.

FIG. 9 is a graph 900 depicting the reliability of an embodiment in accordance with the claimed subject matter. The graph shows preamble detection probability (PDR) 902 as a function of SINR 904 of a received signal. To evaluate the efficacy of the preamble detection at various SINR values, the transmitting node was placed at various distances from the receiving node. To determine how preamble detection improves with increasing preamble length, at each location preamble lengths of 800 ns and 4 µs were used.

In the described embodiment, the receiving node transmitted packets back-to-back continuously. Since noise floor levels at the receiving node typically increase when the device is transmitting, SINR was computed first by setting the receiving node to not transmit any packets. Each (PDR,SINR) point in the graph 900 is computed over 4,000 packet transmissions. As shown, with 800 ns long preambles, the preamble detection probability is close to 100% even at 0 dB SNR. Further, there were no false detections.

If self-interference cancellation removed all noise, preamble detection would not be affected by whether or not the node were transmitting. However, self-interference cancellation typically does not remove all noise due to the parallel preamble transmission. As shown, a PDR of 100% is achieved at around 8 dB SINR. Also, with 4 µs preambles, PDR reaches almost 100% at an SNRs of 5 dB, which result from the increased processing gains.

Figure 10:
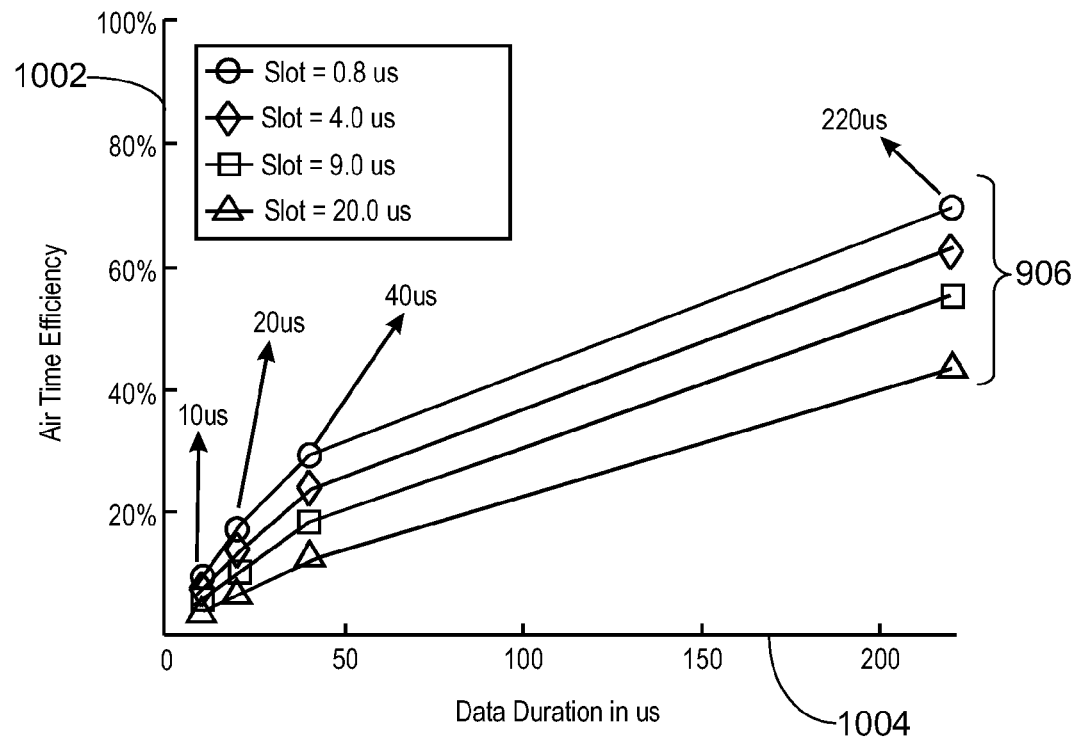
FIG. 10 is a graph depicting the efficiency of an embodiment in accordance with the claimed subject matter.

FIG. 10 is a graph 1000 depicting the efficiency of an embodiment in accordance with the claimed subject matter. The graph represents efficiency 1002 as a function of data duration 1004. Each line 1006 represents a different slot duration. In this graph, efficiency is represented as the fraction of transmitting time when data was transmitted over the air. Packet aggregation, which results in larger packets, increases the fraction of data transmission time in each packet, and decreases the impact of preamble and ACK overheads. The usage of smaller slots leads to increased efficiency by reducing channel access overheads. As such, air-time efficiency is quantified as a function of these two parameters.

In the embodiment represented by the graph, one node with a full queue was allowed to transmit packets. Data transmission duration is the time in µs that data (excluding preambles and ACKs) was transmitted over the air for each packet. As shown, for 800 ns slots when 20 µs worth of data was transmitted, the air-time efficiency was 17.2%. Advantageously, this is 100% improvement over Wi-Fi. As the packet sizes are increased to 40 µs (3 kB packet size) and 220 µs (16 kB packet size), the efficiency increases to 30% and 70%, respectively. The efficiency is lower for larger slot durations than for smaller slot durations. However, even at larger slots such as 9 µs and 20 µs (corresponding to Wi-Fi slot durations), efficiency of the claimed subject matter represents an improvement over that of Wi-Fi due to the elimination of SIFS. It is noted that the typical maximum Ethernet packet size is 1.5 kB (about 2.3 kB for 802.11). In such a case, the use of frame aggregation or lower data-rates may be invoked to motivate the longer transmission times.

Figure 11:
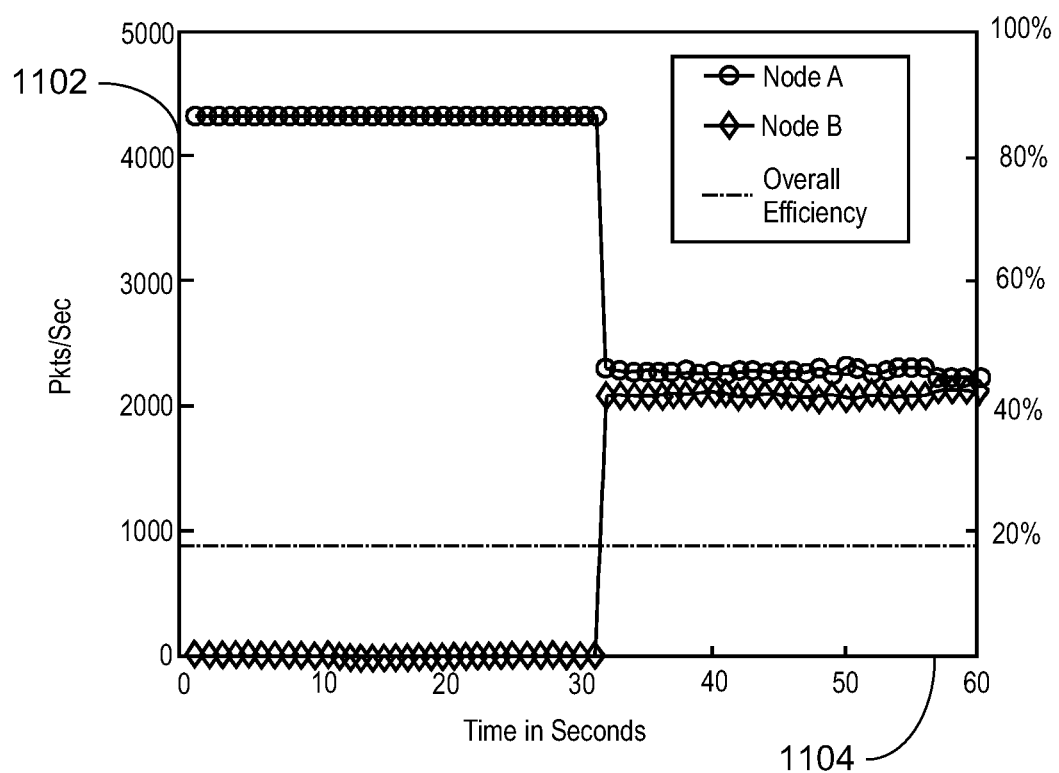
FIG. 11 is a graph depicting the fairness of an embodiment in accordance with the claimed subject matter.

When multiple nodes share a channel, the sharing may be achieved fairly without sacrificing efficiency. FIG. 11 is a graph 1100 depicting the fairness of an embodiment in accordance with the claimed subject matter. The graph represents packets (pkts) per second (sec) 1102 as a function of time 1104. In order to evaluate fair sharing in embodiments of the claimed subject matter, two nodes were operated in parallel. The queues of both nodes were kept full. A first node transmitted alone in order to establish a baseline. Then, a second node was turned on, and both nodes shared a channel. To emulate the effects of a 600 Mbps physical layer or PHY, the packet transmission duration was kept to 20 μs. As shown, the first node transmitting alone achieved a rate of about 4300 Pkts/sec, corresponding to an air-time efficiency of about 17%. When the second node was enabled, both devices were able to transmit packets about 50% of the time (with an error rate of about 2.5% from the half-way mark). Moreover, the efficiency mostly remained the same throughout, indicating that the nodes fairly shared the channel without loss of efficiency.

Another way to reduce overhead is to transmit large packets, thereby reducing the overhead to a fraction of the transmission time. In the 802.11 standard, frame aggregation and block acknowledgements have been incorporated to increase packet sizes of up to 64 KB. As such, data transmission time at 600 Mbps can be increased from 12 μs to 853 μs, thereby reducing the overhead from 90+% to under 20%. Embodiments of the claimed subject matter incorporating frame aggregation and block acknowledgements may still achieve a 25% gain over 802.11 at 600 Mbps.

Figure 12:
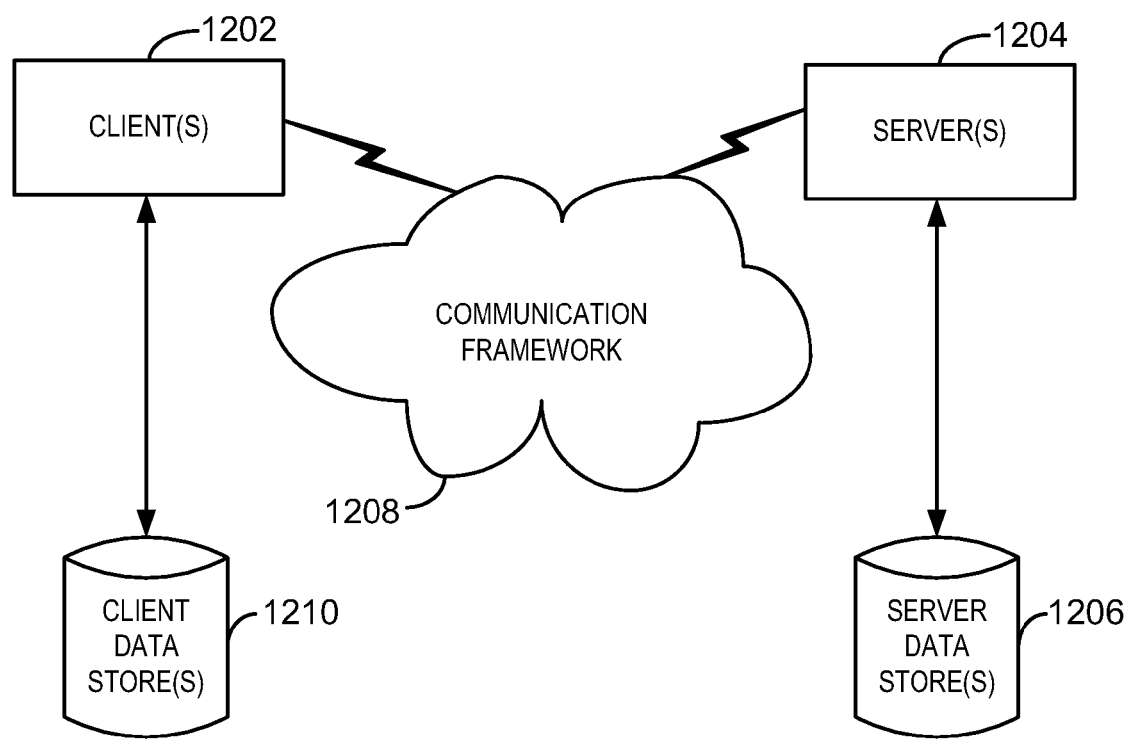
FIG. 12 is a block diagram of an exemplary networking environment for implementing various aspects of the claimed subject matter.
Figure 13:
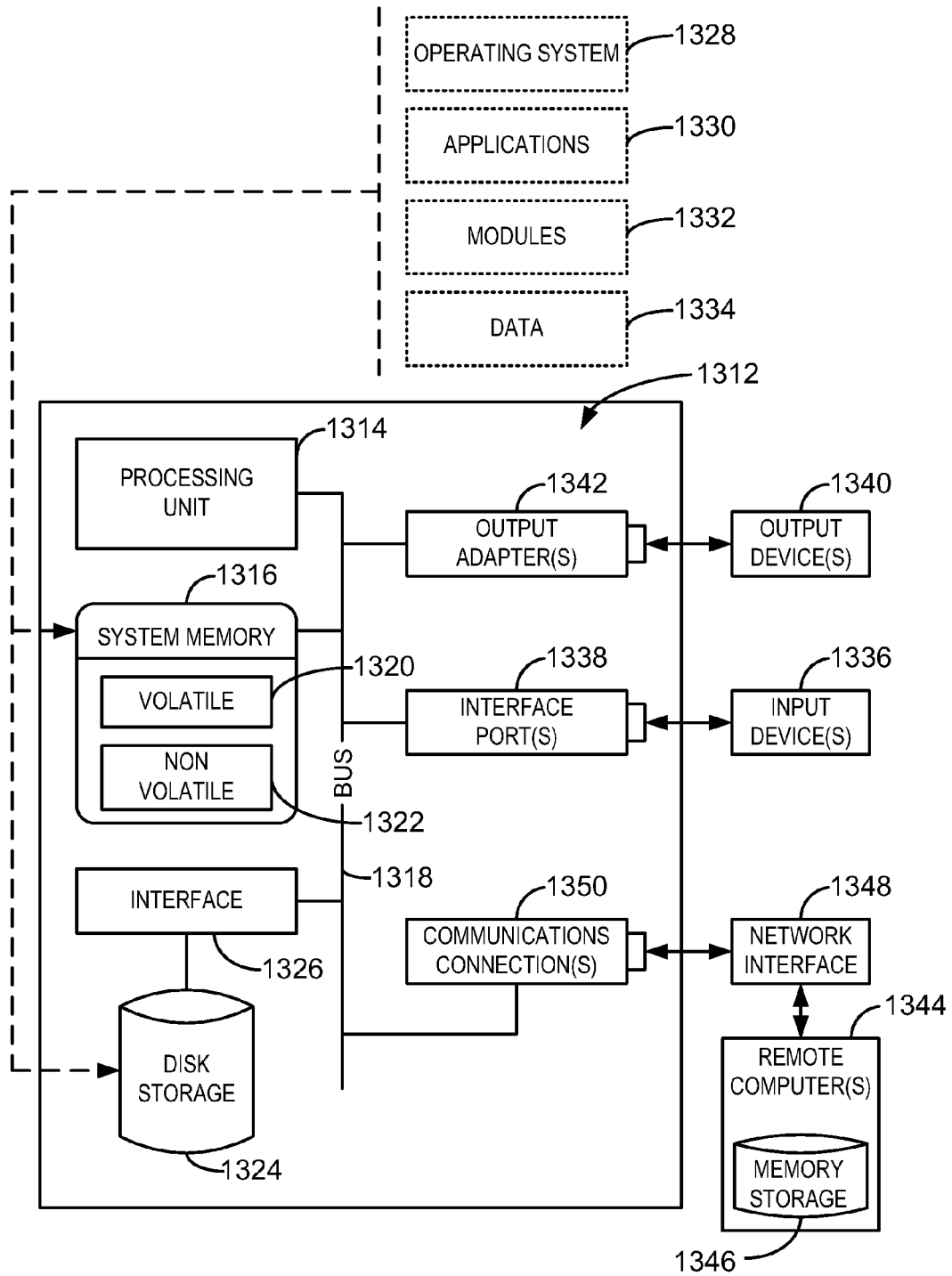
FIG. 13 is a block diagram of an exemplary operating environment for implementing various aspects of the claimed subject matter.

With reference to FIG. 12, an exemplary operating environment 1200 is shown for implementing various aspects of the claimed subject matter. The exemplary operating environment 1200 includes a computer 1212. The computer 1212 includes a processing unit 1214, a system memory 1216, and a system bus 1218.

The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures known to those of ordinary skill in the art. The system memory 1216 comprises non-transitory computer-readable storage media that includes volatile memory 1220 and nonvolatile memory 1222.

The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory.

Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1212 also includes other non-transitory computer-readable media, such as removable/non-removable, volatile/non-volatile computer storage media. FIG. 12 shows, for example a disk storage 1224. Disk storage 1224 includes, but is not limited to, devices like a magnetic disk drive, floppy disk drive, tape drive, Jaz drive, Zip drive, LS-100 drive, flash memory card, or memory stick.

In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212.

System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 1236 connect to the processing unit 1214 through the system bus 1218 via interface port(s) 1238. Interface port(s) 1238 include, for example, a serial port, a parallel port, a game port, and a universal serial bus (USB).

Output device(s) 1240 use some of the same type of ports as input device(s) 1236. Thus, for example, a USB port may be used to provide input to the computer 1212, and to output information from computer 1212 to an output device 1240.

Output adapter 1242 is provided to illustrate that there are some output devices 1240 like monitors, speakers, and printers, among other output devices 1240, which are accessible via adapters. The output adapters 1242 include, by way of illustration and not limitation, video and sound cards that provide a means of connection between the output device 1240 and the system bus 1218. It can be noted that other devices and/or systems of devices provide both input and output capabilities such as remote computer(s) 1244.

The computer 1212 can be a server hosting various software applications in a networked environment using logical connections to one or more remote computers, such as remote computer(s) 1244. The remote computer(s) 1244 may be client systems configured with web browsers, PC applications, mobile phone applications, and the like.

The remote computer(s) 1244 can be a personal computer, a server, a router, a network PC, a workstation, a microprocessor based appliance, a mobile phone, a peer device or other common network node and the like, and typically includes many or all of the elements described relative to the computer 1212.

For purposes of brevity, only a memory storage device 1246 is illustrated with remote computer(s) 1244. Remote computer(s) 1244 is logically connected to the computer 1212 through a network interface 1248 and then connected via a wireless communication connection 1250.

Network interface 1248 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to the computer 1212. The hardware/software for connection to the network interface 1248 may include, for exemplary purposes only, internal and external technologies such as, mobile phone switches, modems including regular telephone grade modems, cable modems and DSL modems, ISDN adapters, and Ethernet cards.

An exemplary processing unit 1214 for the server may be a computing cluster comprising Intel® Xeon CPUs. The disk storage 1224 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for wireless communications, comprising:
    transmitting, by a first node in a wireless network, a first preamble during a clear channel assessment of the wireless network by the first node;
    detecting, in parallel with transmitting the first preamble, a transmission of a second preamble, wherein a second node in the wireless network transmits the second preamble;
    determining a later start between the transmission of the first preamble and the transmission of the second preamble; and
    terminating transmission of the first preamble if the determining indicates that the transmission of the first preamble started after the transmission of the second preamble.

2. The method recited in claim 1, comprising rolling back a backoff counter for the first node to a value corresponding to a difference between a starting slot of the transmission of the first preamble and a starting slot of the transmission of the second preamble.

3. The method recited in claim 1, comprising:
    completing the transmission of the first preamble if the determining indicates that the transmission of the first preamble started before the transmission of the second preamble; and
    transmitting a data packet that is associated with the first preamble.

4. The method recited in claim 1, comprising:
    detecting, in parallel with transmitting the first preamble, one or more transmissions of one or more corresponding preambles, wherein one or more corresponding nodes in the wireless network transmit the one or more corresponding preambles;
    determining a later start between the transmission of the first preamble and each of the one or more transmissions of the one or more corresponding preambles; and
    terminating transmission of the first preamble if the determining indicates that the transmission of the first preamble started after the transmission of any of the one or more transmissions of the one or more corresponding preambles.

5. The method recited in claim 4, comprising terminating the transmission of the first preamble probabilistically if a starting slot of the first preamble equals a starting slot of the one or more corresponding preambles.

6. The method recited in claim 1, wherein transmitting the first preamble comprises transmitting a plurality of sub-parts of the first preamble in a corresponding plurality of time slots.

7. The method recited in claim 6, wherein each of the plurality of time slots comprises a slot duration not less than twice a propagation delay of the wireless network.

8. The method recited in claim 1, wherein detecting the transmission of the second preamble comprises detecting a sub-part of a preamble comprising a pseudo-random sequence, wherein the second preamble comprises the sub-part of the preamble comprising the pseudo-random sequence.

9. The method recited in claim 1, wherein the second preamble comprises a plurality of sub-parts in a corresponding plurality of slots, wherein the corresponding plurality of slots comprise the plurality of sub-parts preceded by a corresponding plurality of pseudo-random sequences.

10. The method recited in claim 1, wherein detecting the transmission of the second preamble comprises a spike in one of the plurality of pseudo-random sequences.

11. A method for wireless communication, comprising:
   transmitting, using a transmit path, an acknowledgement preamble for a received data packet as soon as reception of the received data packet is complete, the received data packet being received using a receive path separate from the transmit path;
   determining, in parallel with transmitting the acknowledgement preamble, whether the received data packet comprises an error; and
   terminating transmission of the acknowledgement if the received data packet comprises an error.

12. The method recited in claim 11, comprising completing the transmission of the acknowledgement if the received data packet does not comprise an error.

13. One or more computer-readable storage memory devices, comprising code configured to direct a processing unit to:
   perform a transmission of a first preamble during a clear channel assessment of a wireless network, wherein a first node in the wireless network transmits the first preamble;
   detect, in parallel with the transmission of the first preamble, a plurality of transmissions of corresponding plurality of preambles, wherein a corresponding plurality of nodes in the wireless network transmit the preambles;
   determine a later start between the transmission of the first preamble and each of the plurality of transmissions of the corresponding plurality of preambles; and
   terminate the transmission of the first preamble if the determining indicates that the transmission of the first preamble started after the transmission of the second preamble.

14. The computer-readable storage memory devices recited in claim 13, comprising code configured to direct the processing unit to roll back a backoff counter for the first node to a value corresponding to a difference between a starting slot of the transmission of the first preamble and an earliest starting slot of one of the plurality of transmissions of the corresponding plurality of preambles.

15. The computer-readable storage memory devices recited in claim 13, wherein the code configured to direct the processing unit to transmit the first preamble comprises code configured to direct the processing unit to transmit a plurality of sub-parts of the first preamble in a corresponding plurality of time slots.

16. The computer-readable storage memory devices recited in claim 13, wherein the code configured to direct the processing unit to detect the transmission of the corresponding plurality of preambles comprises code configured to direct the processing unit to detect a sub-part of a preamble comprising a pseudo-random sequence, wherein each of the corresponding plurality of preambles comprises the sub-part of the preamble comprising a pseudo-random sequence.

17. The computer-readable storage memory devices recited in claim 13, comprising code configured to direct the processing unit to terminate transmission of the first preamble probabilistically if a starting slot of the transmission of the first preamble equals a starting slot of an earliest one of the plurality of transmissions of the corresponding plurality of preambles.

18. The computer-readable storage memory devices recited in claim 13, comprising code configured to direct the processing unit to:
   complete the transmission of the first preamble if the later start between the transmission of the first preamble and each of the plurality of transmissions of the corresponding plurality of preambles does not comprise the first preamble; and
   transmit a data packet that is associated with the first preamble.

19. The computer-readable storage memory devices recited in claim 18, comprising code configured to direct the processing unit to:
   transmit an acknowledgement preamble for a received data packet;
   determine, in parallel with transmitting the acknowledgement preamble, whether the data packet comprises an error; and
   terminate transmission of the acknowledgement if the data packet comprises an error.

20. The method of claim 1, comprising:
   detecting sub-parts of a pseudo-random preamble;
   estimating a transmission start time of the pseudo-random preamble based on the sub-parts; and
   rolling back a backoff counter to the transmission start time.

* * * * *